Feb. 22, 1949.  C. S. MYERS  2,462,331
POLYETHYLENE COMPOSITIONS
Filed April 13, 1944
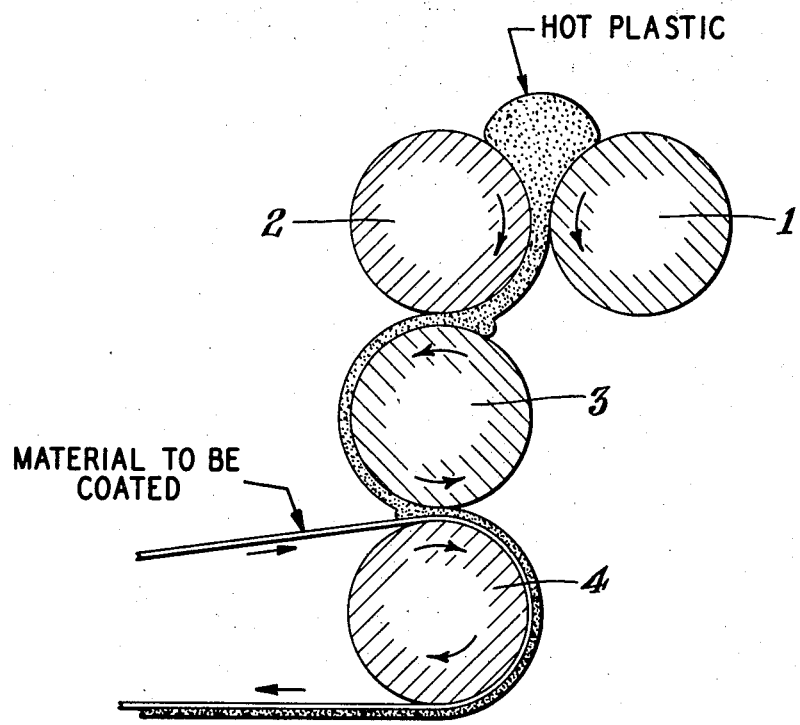
INVENTOR
CLAYTON S. MYERS
BY
ATTORNEY Patented Feb. 22, 1949

2,462,331

UNITED STATES PATENT OFFICE 2,462,331

POLYETHYLENE COMPOSITIONS

Clayton S. Myers, Westfield, N. J., assignor to Bakelite Corporation, a corporation of New Jersey Application April 13, 1944, Serial No. 530,855

5 Claims. (Cl. 260—23)

This invention relates to normally solid polyethylene compositions that are suitable for sheeting, as by calendering, into films or coatings. The normally solid ethylene polymers are crystalline in structure, and they have average molecular weights in excess of about 800 and up to 20,000 and higher when determined by the viscosity-molecular weight rule as modified by Kemp and Peters (Industrial and Engineering Chemistry, vol. 34, No. 9; vol. 35, No. 10). Polyethylenes are characterized by inertness to moisture, acids, alkalies and oils, and also by extremely low power factors, and for these reasons they are particularly valuable as electrical insulation in sheet form.

The polymers, however, have rather sharp softening temperatures at which they change from stiff intractable materials to flowable consistencies. Because of the narrow temperature range the polymers are difficult to calender; and according to a patent to Habgood No. 2,292,441, August 11, 1942, it becomes necessary to heat them almost to the melting point with the accompanying danger that a slight rise causes melting and a slight drop causes hardening or powdering. The patent accordingly proposes the incorporation in a polymer of from 5 to 30 per cent of natural rubber or synthetic rubber-like material to yield a composition remaining plastic over a temperature range convenient for calendering and disclosed by the examples as a range confined to between about 100° and 120° C.

It has now been found that polyethylene compositions highly satisfactory for hot-calendering on paper, fabric or other bases, without the use of solvent and without any deleterious effect on power factor and other desirable properties, can be obtained by the incorporation of slight amounts of polyhydric alcohol esters or metal salts of either saturated or unsaturated monocarboxylic fatty acids. The fatty acids found useful for the purpose are those having from 12 to 24 carbon atoms in the acid radicals such as lauric, oleic, stearic, ricinoleic, etc. The metals include those occurring in groups I, II, III, IV of the periodic table such as lead, copper, cadmium, calcium, aluminum, zinc, etc. The useful polyhydric alcohols consist of the glycols, glycerols, sorbitols, etc., and their substitution products such as their amines, partial ethers and polyoxyalkylene derivatives.

The specific effect of the addition agent in an ethylene polymer appears to be that of a lubricant that causes release of the polymer compound from a hot metal surface. For this purpose only minute amounts that remain compatible with the polymer, ranging from about 0.05 to 9.0 per cent and preferably a fraction of one per cent, are required to produce the changes in the hot-milling properties. About 0.2 per cent addition appears to be about the optimum for the metal salts and from 0.2 to 0.5 per cent for the polyhydric alcohol esters. The physical properties of the polymer are not appreciably altered by such small concentrations of addition agents.

The additions of the modifying agents even in the minute ratios described, are found to cause not only ready release from hot milling and calendering rolls but to give films or coatings of good surface appearance at temperatures elevated considerably above the softening temperatures of the polyethylenes. Elevated temperatures are desirable for reducing the viscosity and imparting surface smoothness and gloss.

To illustrate, a polymer of an average molecular weight (about 18,000), having a Williams flow weight of 46 to 50 mils at 130° C., as determined by a Williams parallel plate plastometer, and containing 0.2 per cent by weight of phenyl-beta-naphthylamine for stabilization against oxidation, was quite soft and sticky at temperatures above 105° C.; at 100° C. it released from the rolls but the film surface was rough and unsuited for subsequent use; when the roll temperature was increased to 120° C. the material adhered so tenaciously that it could not be removed; and the limiting surface temperature for permitting removal from the roll was found to be about 105° C. To the same polymer or resin, with the 0.2 per cent of phenyl-beta-naphthylamine included as anti-oxidant, was then added 0.5 per cent of propylene-glycol-monostearate, and it was fluxed and milled at a contacting surface temperature of 100° to 105° C. with ready removal and without sticking; when the mill surface temperature was increased to 140° C., there was still good release and a surface quality superior to the composition that had no stearate included. A reduction to 0.25 per cent of propylene-glycol-monostearate gave a composition with good release and surface quality at a roll temperature of 150° C. The substitution of 0.5 per cent of diethylene-glycol monolaurate for the stearate gave a composition that sheeted successfully at 145° C. The composition with 0.5 per cent of glycerol tristearate in place of glycol-monostearate sheeted without sticking at 120° C. and had a good surface appearance.

Again, using the same polyethylene as before, 9.0 per cent of fused lead stearate was incorporated. The composition readily released when milled at 150° C.; but upon cooling it was found that the sheet whitened on crimping, and this indicated a limited compatibility of the lead soap with the polyethylene. The fused lead stearate was reduced to 0.2 per cent, and at 135° C. the composition calendered with good release and without noticeable whitening on crimping. The concentration of lead stearate was further reduced to 0.05 per cent in another composition; this, it was found, could not be milled and calendered at a roll temperature above 105° C. without sticking; but, when about 20 per cent of carbon black was included, the composition was successfully milled and calendered at 120° C. without sticking to the rolls. The results obtained with other metal soaps are summarized in the following table, the same polyethylene being used in each case with 0.2 per cent of antioxidant included.

Table

| Addition Agent | Concentration, percent | Release at Indicated Roll Surface Temp. |
| --- | --- | --- |
| None | 0 | Poor at 105° C. |
| Cadmium Stearate | 0.5 | Good at 135° C. |
| Do | 0.125 | Good at 150° C. |
| Cadmium Laurate | 0.5 | Good at 120° C. |
| Calcium Stearate | 0.5 | Poor at 105° C. |
| Aluminum Laurate | 0.5 | Good at 115° C. |
| Aluminum Tristearate | 0.5 | Fair at 105° C. |
| Copper Distearate | 1.0 | Good at 150° C. |

In each of the foregoing illustrations, the batch was made by fluxing the polyethylene on a differential speed two-roll mill heated by steam. The modifying agent was added to the batch which was then mixed and homogenized by the conventional technic normally used for milling rubber compounds.

While the foregoing illustrations are directed to stearates and laurates, other esters and salts of fatty acids can be incorporated in polyethylenes in substantially the same proportions to act as release agents without interfering with the useful properties of the polyethylenes. For instance, effective esters of modified polyalcohols and fatty acids include sorbitan monolaurate, sorbitan trioleate, etc.

The polyethylenes, having release agents included as herein disclosed, can be modified by admixture with other ingredients to vary the physical and chemical properties of the films or coatings. Among such ingredients are polyisobutylene and other hydrocarbon resins that can be incorporated in amounts ranging from 1 to 75 per cent in accordance with the effects desired.

For calendering into films or coatings on paper, fabric and other bases, conventional methods and apparatus can be used. Such an apparatus is shown in the acompanying drawing as consisting of four rolls 1, 2, 3, 4, suitably supported and provided with heating means not shown.

As specific compositions for demonstrating the calendering operation, the following materials in the proportions indicated were fluxed in a Banbury mixer and milled on rolls to produce a soft plastic mass at a temperature of 130° to 140° C.

| Ingredients | A | B |
| --- | --- | --- |
| | Per cent | Per cent |
| Polyethylene, av. mol. wt. 18,000 | 99.6 | 74.6 |
| Anti-oxidant | 0.2 | 0.2 |
| Fused lead stearate | 0.2 | 0.2 |
| Polyisobutylene, av. mol. wt. 120,000 | | 25.0 |

Each composition in the soft plastic condition was charged into the bite between the rolls 1 and 2, spaced about 0.010 inch and rotating in the direction shown by the arrows: roll 1 had a surface temperature of 145° C. and roll 2 a temperature of 148° C. for both compositions, and enough of the plastic was charged to maintain a pool in the bite. The sheeted plastic, as it emerged from between rolls 1 and 2, was directed between rolls 2 and 3, set about 0.005 inch apart to reduce the thickness; roll 3 had a surface temperature of 145° C. From roll 3, the sheet passed between rolls 3 and 4 to further reduce the film thickness; roll 4 was maintained at a surface temperature of 145° C. Also between the pair of rolls 3 and 4 was passed a base material of sulfite paper, 0.004 inch thick, having a rather porous structure to which the film adhered to yield an attractive continuous coating with a good bond to the base; penetration into the paper made it impossible to remove the plastic film. In this calendering operation no solvent was needed.

A modification of the foregoing process used glassine paper as the base material, and the rolls were set to give a film thickness on the glassine paper of about 0.002 to 0.004 inch in thickness. It was found that the films could be stripped from the glassine support to give self-sustaining films of the compositions. The operation also provides a means of preparing a film-glassine composite; and the film of the composite can be transferred to another backing material by cementing or pressing the film against the backing and then stripping the glassine paper from the surface.

By the calendering process films or coatings can be applied to bases, both impervious and pervious, as parchment, metal foil, leather, paper, cloth, wire screen, etc.

The ethylene polymer, modified by a release agent as disclosed, can be prepared in sheet form by other known operations. The film can for example be stripped as it comes from the pass between rolls 3 and 4 without introducing a base to which it adheres. It is also possible, in the case of low molecular weight ethylene polymers (800 to 2000), to knife-coat or otherwise spread the polymer composition in a hot plastic state on a metal plate or other suitable support; uniformity in thickness is difficult by this procedure, but the composition after spreading can be subjected to a hot-pressing operation between press platens or hot rolls to minimize non-uniformity.

While the merits of the release agents described are particularly significant in the calendering of films, the agents are also valuable processing aids in other operations where hot metal surfaces that may introduce difficulties are encountered, such as Banbury-mixing, milling, extruding, molding, etc.

What is claimed is:

1. Product comprising a polymer of ethylene characterized by a crystalline structure of narrow softening temperature range and adhesion to rolls at temperatures of 100° C. and above and having incorporated therein from 0.05 to 9 per cent of a modifying agent selected from the group consisting of polyhydric alcohol esters and metal salts of monocarboxylic fatty acids having from 12 to 24 carbon atoms, the modified polymer being characterized by ready release from rolls at temperatures above the adhesion temperature of the unmodified polymer.

2. Product comprising a polymer of ethylene characterized by a crystalline structure of narrow softening temperature range and adhesion to rolls at temperatures of 100° C. and above and having incorporated therein from 0.05 to 9 per cent of a stearate of a polyhydric alcohol, the modified polymer being characterized by ready release from rolls at temperatures above the adhesion temperature of the unmodified polymer.

3. Product comprising a polymer of ethylene characterized by a crystalline structure of narrow softening temperature range and adhesion to rolls at temperatures of 100° C. and above and having incorporated therein from 0.05 to 9 per cent of a metal stearate, the modified polymer being characterized by ready release from rolls at temperatures above the adhesion temperature of the unmodified polymer.

4. Product comprising a polymer of ethylene characterized by a crystalline structure of narrow softening temperature range and adhesion to rolls at temperatures of 100° C. and above and having incorporated therein from 0.05 to 9 per cent of propylene-glycol monostearate as a modifying agent, the modified polymer being characterized by ready release from rolls at temperatures above the adhesion temperature of the unmodified polymer.

5. Product comprising a polymer of ethylene characterized by a crystalline structure of narrow softening temperature range and adhesion to rolls at temperatures of 100° C. and above and having incorporated therein from 0.05 to 9 per cent of cadmium stearate as a modifying agent, the modified polymer being characterized by ready release from rolls at temperatures above the adhesion temperature of the unmodified polymer.

CLAYTON S. MYERS.

REFERENCES CITED

The following references are of record in the file of this patent:

UNITED STATES PATENTS

| Number | Name | Date |
| --- | --- | --- |
| 2,181,481 | Gray | Nov. 28, 1939 |
| 2,306,790 | Meigs | Dec. 29, 1942 |
| 2,326,543 | Macht | Aug. 10, 1943 |
| 2,341,186 | Matheson et al. | Feb. 8, 1944 |
| 2,405,977 | Peters | Aug. 10, 1946 |